Nov. 24, 1942. K. E. BUFF 2,303,195
TRIM PANEL
Filed Feb. 19, 1940
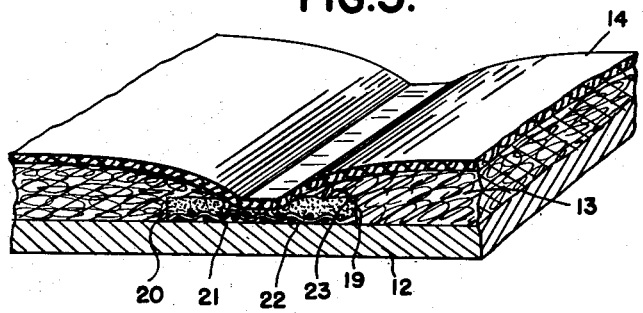
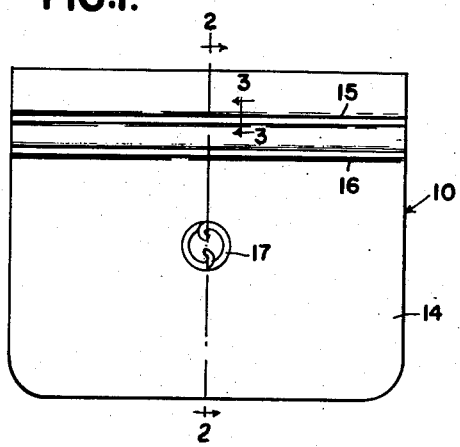
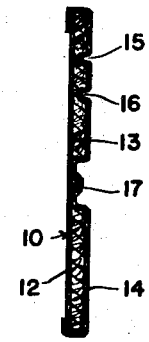
INVENTOR.
KARL E. BUFF
BY Whittemore, Hulbert
& Belknap ATTORNEYS Patented Nov. 24, 1942

2,303,195

UNITED STATES PATENT OFFICE 2,303,195

TRIM PANEL

Karl E. Buff, Detroit, Mich., assignor to National Automotive Fibres, Inc., Detroit, Mich., a corporation of Delaware Application February 19, 1940, Serial No. 319,756

14 Claims. (Cl. 154—45.9)

The present invention relates to trim panels and more particularly to trim panels for motor vehicles of the type embodying a panel board, such for example as an asphalt impregnated cardboard, an overlying trim fabric of a suitable trim material, such for example as broadcloth, mohair or the like, and an intermediate padding material, such for example as loosely aggregated fibrous material or wadding.

In order to impart a decorative appearance to the exposed face of the trim panel it has in the past been proposed to provide the padding material in a corresponding design and to thereby leave certain areas of the panel board exposed or devoid of padding material. The trim fabric is then by one means or another secured to the panel board at the areas at which there is no padding material. This results in providing the exposed surface of the trim material with a relief design corresponding to the design in which the padding material was initially formed.

This method of manufacturing trim panels has never been commercially acceptable for the reason that it was found substantially impossible to establish a satisfactory bond between the trim fabric and the panel board. Adhesives which would retain the fabric with sufficient strength had a tendency to bleed through the trim fabric and discolor the exposed face thereof.

According to the present invention a new bond and method of bonding between the fabric and panel board has been devised. This bond is characterized by the provision of an area of a light weight fabric, such for example as tobacco cloth, adhered to the panel board at the exposed areas, and an overlying coating of relatively thick adhesive.

It is accordingly an object of the present invention to provide a bond between a trim fabric and a panel board characterized by the provision of an area of light weight fabric in combination with coacting adhesive.

It is a further object of the present invention to adhere a trim fabric to a panel board by first adhering an area of a relatively light weight fabric directly to the face of the panel board, providing a relatively thick ply of adhesive over the relatively light weight fabric and adhering the trim fabric to the adhesive and to the relatively light weight fabric.

Other objects of the invention will be apparent as the description proceeds, and when taken in conjunction with the accompanying drawing wherein:

Figure 1 is a front elevational view of a trim panel made according to the present invention;

Figure 2 is a vertical sectional view taken on the line 2—2 of Figure 1; and

Figure 3 is an enlarged fragmentary perspective view based on a section taken at the line 3—3 of Figure 1.

In Figures 1 and 2 I have indicated generally at 10 a trim panel which is made up of a panel board 12, padding material 13, and a trim fabric 14. As best seen in Figure 2, padding material is applied in a design so as to provide, in the embodiment illustrated, depressed substantially parallel bands 15 and 16 and a medallion 17. Preferably the padding material 13 is removed at 15, 16 and 17 respectively to provide the desired design on the front of the panel board 12.

The medallion 17 in the embodiment illustrated is circular, but in practice it may assume any shape, and may for example be a monogram, or insignia.

The details of the construction are best seen in Figure 3. The padding material 13 terminates along lines 19 and 20 so as to leave exposed an area 21 of the panel board. To this area 21 of the panel board is applied a light coating of adhesive, and adhering to this coating is a relatively light open-weave fabric 22, which may conveniently be tobacco cloth. Over the fabric 22 is applied a relatively thick area of adhesive 23.

The trim fabric 14 is then placed over the padding material on the panel board in a wellknown manner and its edges are secured around the edges of the panel board and preferably adhered to the back thereof. By suitable means, as for example, a die, the fabric 14 is then depressed into the adhesive 23. This operation results in forming the surface of the trim fabric, as well illustrated in Figures 1 and 2, and furthermore results in the establishment of a substantially permanent bond between the fabric 14 and the panel board 12.

The reason for the exceptional strength of the bond thus produced is probably due to the following considerations: The panel board 12, as conventionally used in the industry today, is an asphalt impregnated or treated fiber board. Boards of this type are strongly resistant to moisture and do not change their dimensions under various conditions to an objectionable degree. The material of this type of board does not have particularly great inherent cohesive strength, and as a result, if a narrow zone of fabric is adhered to the surface of the panel board and is then pulled away from the panel board, the separation occurs beneath the surface of the panel board.

This occurs under normal conditions of use of trim panels and has heretofore rendered direct adhesion of the trim fabric and the panel board impractical.

It may be further noted that this condition is not avoided by applying the adhesive to the panel board over a wide area and adhering the fabric at a small area. In this case, when the fabric is pulled away, the film or ply of adhesive separates where it adhered to the fabric, from the balance of the adhesive, and the material of the board separates beneath the surface thereof and permits separation of the fabric and board.

Evidently this difficulty cannot be overcome by selecting an adhesive of increased strength for the reason that the strength of the adhesives previously employed was sufficient to provide the bond, but separation between the cloth and panel board as a whole occurred beneath the surface of the panel board.

According to the present invention a relatively large area of a light fabric, such as tobacco cloth, is adhered directly to the surface of the panel board. By increasing the area of bond between this fabric and the surface of the panel board, the fabric as a whole may be firmly bonded to the panel board and the tendency for the separation to occur beneath the surface of the panel board is thus largely obviated. If now adhesive is applied over the light fabric and the trim fabric is adhered thereto, a satisfactory bond may be established between the trim fabric and the light open-weave fabric. Furthermore, as previously stated, the bond between the light open-weave fabric and the panel board as a whole is satisfactory because of the increased area throughout which the bond is effective.

Tests have demonstrated that when the fabric is bonded as illustrated in Figure 3 it exhibits very greatly increased permanence of bond as compared to the type of bond employed in bonding the trim fabric directly to the panel board.

The light weight fabric may be applied in many forms. The essential requirement is that the area of the light weight fabric shall be greater than the area of the zone of adhesion between the light weight fabric and the trim fabric. Thus in Figure 1, separate strips of light weight fabric may underlie each of the bands 15 and 16 or a single strip may be employed of a width sufficient to underlie both bands. The light weight fabric underlying a design such as the medallion 17 will ordinarily be somewhat larger than the entire medallion. Where a complex design extending over the entire panel is used, it is ordinarily simpler to cover the entire surface of the panel board with the light weight fabric. In any case, however, the light weight fabric is adhered to the panel board throughout a greater area than the area of adhesion of the trim fabric, and preferably extends beyond the same on at least two sides.

It will be understood that trim panels embodying this type of bond may be made by various methods, and the present invention is concerned particularly with the mode of securing the trim fabric to the panel board. For example, different methods of providing padding material on the panel board may be employed. One complete method of trim panel manufacture may be by application of padding material to the whole surface of the panel board, after which it is then removed from the areas corresponding to the desired depressed portions of the relief design. On the other hand, if preferred, padding material may be a wadding or a felt and may be precut to the desired form and applied either by machine or by hand. In the latter case, the light open-weave fabric 21 may be applied to the panel board either before or after application of the die-cut padding material.

The adhesive employed may be any suitable adhesive, and I have found that a rubber or rubber compound dispersion including a vulcanizing agent is entirely suitable. In this case I prefer to establish the bond between the trim fabric and the panel board by die-pressing the trim fabric into the adhesive, employing a heated die for this purpose. Temperatures employed will of course be insufficient to injure the trim fabric but are preferably sufficient to initiate vulcanization of the rubber dispersion. The temperature, time and pressing factors are selected in accordance with the particular adhesive.

As an alternative, suitable resin solutions or dispersions may be employed, and these may be either thermo-setting or otherwise as desired. Also mixtures of rubber and resin dispersions have been found suitable for the purpose.

As an alternative, in the method of applying the adhesive, the light open-weave fabric 22 may be placed on the panel board without first providing an adhesive therebeneath. The thick coating of adhesive 23 is then applied thereover and will cause the fabric 22 to adhere to the panel board. Preferably, after application of the adhesive to the panel board, the same is allowed to set for a sufficient interval to substantially immobilize the adhesive.

While I have described a single embodiment of my invention with considerable detail, this has been done solely for the purpose of enabling those skilled in the art, without further experiment, to practice the invention, the scope of which is indicated by the appended claims.

What I claim as my invention is:

1. A trim panel comprising an asphalt impregnated panel board, padding material arranged in a desired design on the front of said panel board leaving certain areas of said board uncovered, an open-weave textile fabric adhered to said panel board at said areas, a cement overlying said fabric, and a trim fabric covering the front of said board and overlying said padding material, said trim fabric adhered by said cement to an area of said open weave fabric less than its entire area.

2. A trim panel comprising an asphalt impregnated panel board, padding material arranged in a desired design on the front of said panel board leaving certain areas of said board uncovered, a light weight textile fabric adhered to said panel board at said areas, a relatively thick cement overlying said fabric, and a trim fabric covering the front of said board and overlying said padding material, said trim fabric embedded in said cement throughout an area less than the entire area of said light weight fabric.

3. A trim panel comprising an asphalt impregnated panel board, a relatively wide strip of cloth adhered to the front of said board, a relatively thick ply of cement over said cloth, and a trim fabric covering the front of said board, said trim fabric being adhered to said cement along a relatively narrow zone of said cement, the area of said zone being less than the area of said strip of cloth.

4. A trim panel comprising an asphalt impregnated panel board, a relatively wide strip of open-weave cloth adhered to the front of said board, a relatively thick ply of cement over said cloth, and a trim fabric covering the front of said board, said trim fabric being embedded in said cement along a relatively narrow zone of said cement, the area of said zone being less than the area of said strip of cloth.

5. In a trim panel, an asphalt impregnated panel board, a trim fabric overlying one side of said board, means securing said trim fabric to the board throughout a limited area comprising a light weight fabric adhered to said board throughout an area at and extending beyond said limited area, said trim fabric being adhered to said light weight fabric throughout said limited area, whereby said light weight fabric is adhered to said board over an area greater than the area throughout which said trim fabric is adhered to said light weight fabric.

6. A trim panel comprising an asphalt impregnated panel board, a relatively large area of cloth adhered to said board, a relatively thick ply of cement over said cloth, and a trim fabric covering said board, said trim fabric being adhered to said cloth by said cement throughout an area substantially less than the area of said cloth.

7. A trim panel comprising an asphalt impregnated panel board, a relatively large area of cloth adhered to said board, a relatively thick ply of cement over said cloth, and a trim fabric covering said board, said trim fabric being adhered to said cloth by said cement throughout an area substantially less than the area of said cloth, said cloth being adhered to said board beyond and at opposite sides of the area throughout which said trim fabric is adhered to said cloth.

8. In a trim panel, an asphalt impregnated panel board having a cohesive strength insufficient to insure an adequate bond with a trim fabric cemented thereto at a small area, a trim fabric overlying one side of said board, means securing said trim fabric to the board throughout a limited area comprising a lightweight fabric adhered to said board throughout an area at and extending beyond said limited area, said trim fabric being adhered to said light weight fabric throughout said limited area, whereby said light weight fabric is adhered to said board over an area greater than the area throughout which said trim fabric is adhered to said light weight fabric.

9. A trim panel comprising an asphalt impregnated panel board having a cohesive strength insufficient to insure an adequate bond with a trim fabric cemented thereto at a small area, a relatively large area of cloth adhered to said board, a relatively thick ply of cement over said cloth, and a trim fabric covering said board, said trim fabric being adhered to said cloth by said cement throughout an area substantialy less than the area of said cloth.

10. A trim panel comprising an asphalt impregnated panel board having a cohesive strength insufficient to insure an adequate bond with a trim fabric cemented thereto at a small area, a relatively large area of cloth adhered to said board, a relatively thick ply of cement over said cloth, and a trim fabric covering said board, said trim fabric being adhered to said cloth by said cement throughout an area substantially less than the area of said cloth, said cloth being adhered to said board beyond and at opposite sides of the area throughout which said trim fabric is adhered to said cloth.

11. In a trim panel, an asphalt impregnated panel board having a cohesive strength insufficient to insure an adequate bond with a trim fabric cemented thereto at a small area, a trim fabric overlying one side of said board, means securing said trim fabric to the board throughout a limited area comprising an open-weave fabric adhered to said board throughout an area at and extending beyond said limited area, said trim fabric being adhered to said open weave fabric throughout said limited area, whereby said open weave fabric is adhered to said board over an area greater than the area throughout which said trim fabric is adhered to said open weave fabric.

12. A trim panel having an asphalt impregnated panel board, layers of padding material spaced apart upon one surface of said panel board and leaving uncovered therebetween a portion of said surface, a light weight fabric in the space between said spaced layers of padding material and adhered in surface to surface relation to the uncovered portion of the panel board, an overlying coating of adhesive on the light weight fabric, and a common covering for said spaced layers of padding material and light weight fabric comprising trim material overlying said layers of padding material and light weight fabric and having a portion adhered in surface to surface relation to the coating of adhesive on the light weight fabric, the area of adhesion between the fabric and panel board being greater than the area of adhesion between the trim material and fabric.

13. A trim panel having an asphalt impregnated panel board, layers of padding material spaced apart upon one surface of said panel board and leaving uncovered therebtween a portion of said surface, a coating of adhesive on the uncovered portion of the panel board between the spaced layers of padding material, a fabric adhered in surface to surface relation to said adhesive, a coating of adhesive upon the adhered fabric, and trim material overlying the spaced layers of padding material and fabric and having a portion adhered to the adhesive on the fabric, the area of adhesion between the fabric and panel board being greater than the area of adhesion between the trim material and fabric.

14. A trim panel having an asphalt impregnated fiber board, a light weight fabric of predetermined area adhered in surface to surface relation to the fiber board, an overlying coating of adhesive on the light weight fabric, and a covering for said fiber board comprising trim material overlying said light weight fabric and having a portion adhered in surface to surface relation to the coating of adhesive on said light weight fabric, the area of adhesion between the fabric and fiber board being greater than the area of adhesion between the trim material and fabric.

KARL E. BUFF.